United States Patent [19]
Frentzel et al.

[11] 3,913,532
[45] Oct. 21, 1975

[54] ROTARY ENGINE

[75] Inventors: Herman C. Frentzel, Shorewood; Thomas H. Frentzel, Whitefish Bay, both of Wis.

[73] Assignee: Frentzel Development, Inc., Milwaukee, Wis.

[22] Filed: Nov. 5, 1973

[21] Appl. No.: 412,975

[52] U.S. Cl. .................. 123/8.31; 418/91; 418/121; 418/142; 418/196
[51] Int. Cl.² ......................................... F02B 53/08
[58] Field of Search ................. 123/8.27, 8.31, 8.33; 418/91, 119, 121, 122, 142, 196

[56] References Cited
UNITED STATES PATENTS

| | | | |
|---|---|---|---|
| 1,118,840 | 11/1914 | Bjornson | 418/121 |
| 2,070,631 | 2/1937 | Sowderland | 418/196 X |
| 2,722,201 | 11/1955 | Muse | 123/8.27 |
| 3,373,722 | 3/1968 | Zimmermann | 123/8.45 |

FOREIGN PATENTS OR APPLICATIONS

| | | | |
|---|---|---|---|
| 245,277 | 1/1926 | United Kingdom | 123/8.27 |
| 1,810,346 | 6/1970 | Germany | 418/196 |
| 921,653 | 12/1954 | Germany | 123/8.27 |

*Primary Examiner*—C. J. Husar
*Assistant Examiner*—Leonard Smith
*Attorney, Agent, or Firm*—Quarles & Brady

[57] ABSTRACT

A rotary engine includes a main power rotor mounted for rotation within a main chamber of an engine housing and a pair of interacting auxiliary rotors. Lobes on the main power rotor extend outward into the main chamber and each serves to compress air ahead of it during a compression portion of the operating cycle and to drive the rotor when the compressed charge is ignited behind it. Removable sealing bars on each lobe prevent wasteful leakage of the compressed charge and a combustion control chamber formed in one auxiliary rotor stores the compressed charge as it is transferred from the leading to the trailing side of the lobe. A stationary combustion control valve within the auxiliary rotor entraps the air charge during this transfer to prevent leakage between moving parts. Air passages through the main power rotor remove heat during engine operation and the preheated air is used in the engine to increase efficiency.

9 Claims, 9 Drawing Figures

3,913,532

ROTARY ENGINE

BACKGROUND OF THE INVENTION

The field of the invention is rotary engines of the type having a power rotor mounted for rotation within a housing and one or more auxiliary rotors which engage and rotate in the opposite direction about axes parallel to the power rotor axis.

There are numerous types of rotary engines in which a chamber is formed between a stationary housing and a rotating member and an air-fuel mixture is burned in the chamber to generate rotary power. One such rotary engine is illustrated by U.S. Pat. No. 2,742,882 which issued to L. F. Porter on Apr. 24, 1956. Such engines include a main power rotor which is journaled for rotation within a housing and an annular main chamber is formed around the power rotor. Two or more integrally formed lobes extend radially outward from the power rotor to engage the chamber walls during operation, and one or more auxiliary rotors are mounted to the housing for rotation about axes parallel to the main rotor axis. These auxiliary rotors extend into the main chamber and are positioned to engage the outer surface of the main rotor.

The successful operation of such rotary engines depends on the maintenance of an affective seal between the rotor lobes and the chamber walls and between the surface of the auxiliary rotors and the surface of the main power rotor. The escape of highly compressed air or air-fuel mixture substantially reduces engine power and efficiency. The sealing problem is particularly acute when a lobe is rotated past an auxiliary rotor and is received by a recess formed therein which allows clearance between it and the radially extended lobe. Although the basic concepts of this type of rotary engine have long been known and are basically sound, the difficulty in sealing the various movable elements has hitherto limited the practical application of this engine.

SUMMARY OF THE INVENTION

The invention relates to a means of sealing the movable elements of a rotary engine, and particularly, to prevent highly compressed air and air-fuel mixture from escaping around the lobes formed on the power rotor. More specifically, the invention includes a combustion control auxiliary rotor having a control chamber formed therein and a passage connecting the control chamber to a recess which provides clearance for the lobe as it rotates past the combustion control rotor. A stationary combustion control valve is positioned within the control chamber and it is aligned to block the passage over a preset portion of the operating cycle. A removable sealing bar arrangement extends across the surface of each lobe and maintains a seal with the main chamber walls, however, as the lobe passes the combustion control rotor this seal is momentarily lost. The present invention overcomes this difficulty by forcing the air which is compressed ahead of the lobe into the control chamber where it is entrapped by the combustion control valve until the lobe reestablishes sealing engagement with the chamber wall. The combustion control valve then opens the passage and the air is released into the main chamber where it is ignited.

It is a general object of the invention to transfer air which has been compressed by the leading side of a lobe to the trailing side of the same lobe while maintaining sealing engagement between the movable elements of the engine. The transfer is accomplished by forcing the air into the control chamber formed in the combustion control rotor and releasing it after the lobe has passed. Improved sealing is provided both by an interlocking sealing bar arrangement which is attached to the lobe and which engages the chamber walls and the combustion control valve located within the combustion control rotor.

The foregoing and other objects and advantages of the invention will appear in the following description. In the description reference is made to the accompanying drawings which form a part hereof, and in which there is shown by way of illustration a preferred embodiment of the invention. Such embodiment does not necessarily represent the full scope of the invention and reference is made to the claims herein for interpreting the breadth of the invention.

DESCRIPTION OF THE PREFERRED EMBODIMENT

Figure 1:
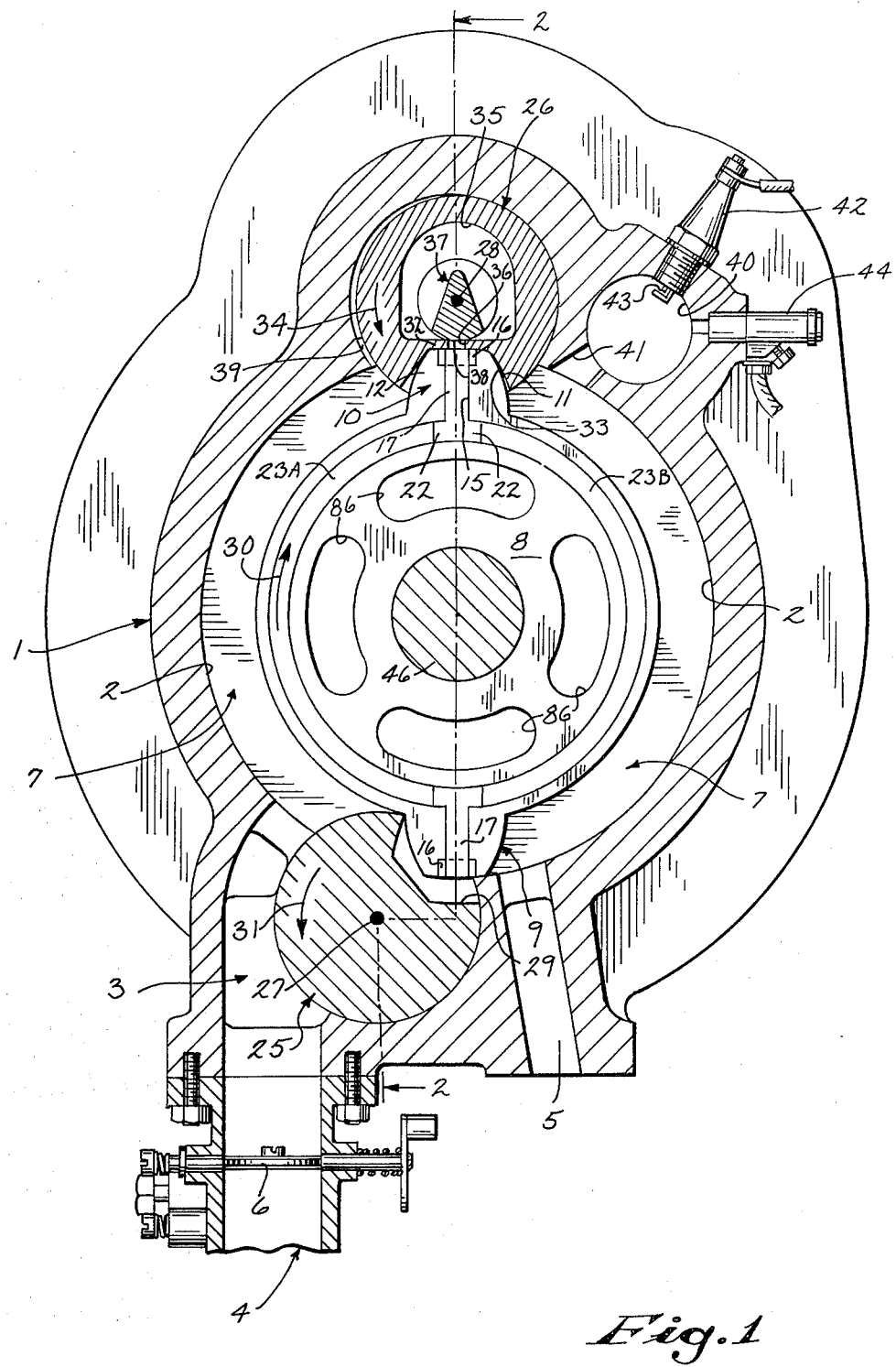
FIG. 1 is a schematic view which illustrates the basic engine components.

Referring to FIG. 1, the invented rotary engine includes a stator or housing 1 in which a relatively large circular, cylindrical chamber is defined by walls 2. An air intake manifold 3 communicates with the chamber and connects through a carburetor 4 to the atmosphere. Although a conventional carburetor can be used, in the preferred embodiment fuel injection is used and the carburetor 4 contains only a single butterfly valve 6 which controls the amount of intake air supplied to the engine. In the description which follows, therefore, fuel is not mixed with the air during the compression portion of the operating cycle, however, it should be readily apparent to those skilled in the art that the operation of the engine is the same if the fuel is mixed at the carburetor 4. An exhaust port 5 is formed in the housing 1 and connects the chamber to atmosphere. A muffler (not shown in the drawings) may be attached to the exhaust port 5 to provide the desired noise silencing.

Mounted for rotary motion within the chamber is a main power rotor 8. The power rotor 8 has a generally circular cylindrical shape and its axis of rotation is coincident with the central axis of the chamber. The power rotor 8 is significantly smaller in diameter than the chamber wall 2 with the result that an annular shaped main chamber 7 is formed between the outer surface of the power rotor 8 and the chamber wall 2.

Figure 6:
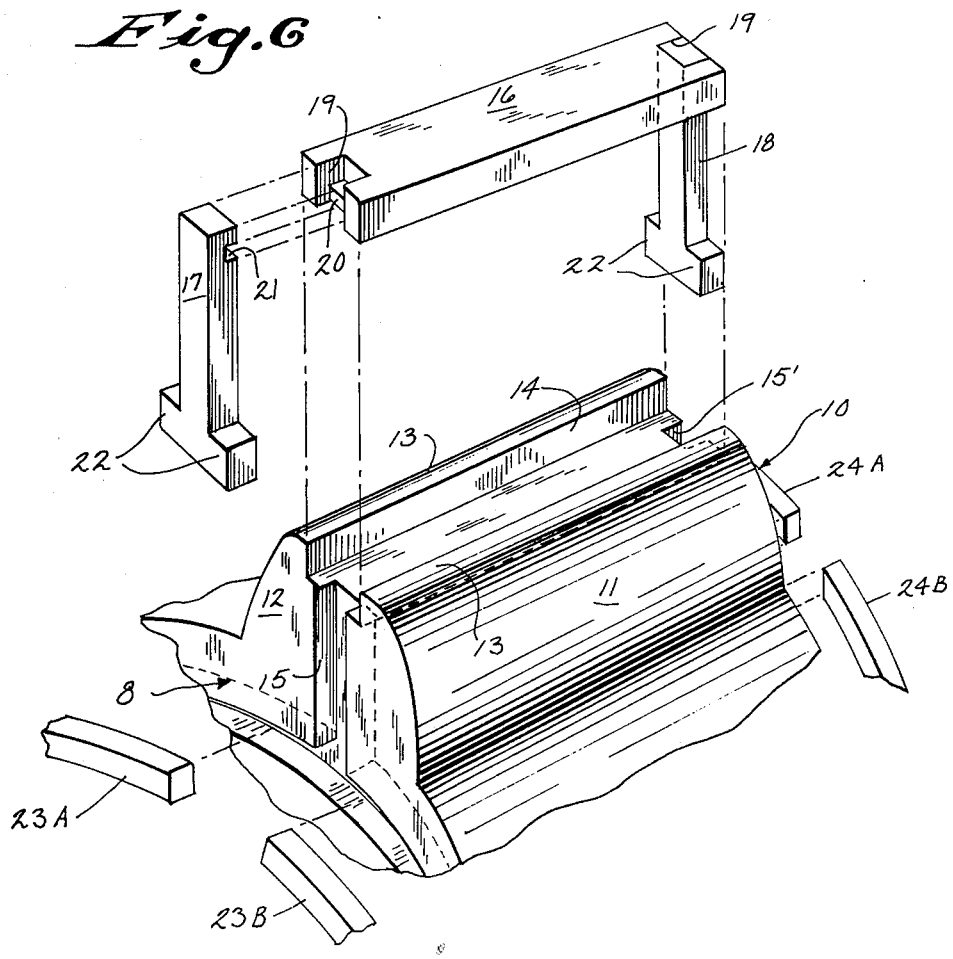
FIG. 6 is an exploded perspective view of a lobe on the main power rotor of the invented rotary engine.

Integrally formed on the main power rotor 8 are a pair of opposing lobes 9 and 10 which extend radially outward from its outer surface and into sealing engagement with the chamber walls 2. Referring particularly to FIG. 6, the lobe 10 includes a pair of curved side surfaces 11 which extend outward from the power rotor surface, a pair of end surfaces 12 which join the sides 11, and a top surface 13. A rectangular recess 14 is formed along the entire length of the lobe 10 in its top surface 13 and rectangular recesses 15 and 15' of less width are formed in the end surfaces 12. A set of interlocking sealing bars 16, 17 and 18 rest within these respective recesses 14, 15 and 15' and these are of slightly greater dimension than the recesses to raise them above the surfaces of the lobe 10 into bearing engagement with the chamber walls 2. The sealing bars 16–18 are made of steel similar to that used to form conventional piston rings and are easily replaced when worn. The top sealing bar 16 is generally rectangular in shape, but includes a notch 19 in each of its ends for receiving the upper ends of the sealing bars 17 and 18. A web 20 is disposed in each notch 19 and mates with a groove 21 formed transversely across the upper end of the bars 17 and 18. Each end bar 17 and 18 includes a pair of outwardly extending ears 22 at their lower end which mate with a corresponding enlargement at the lower end of the respective recesses 15 and 15'. An interlocking and replacable seal is thus formed around the outer surface of each lobe 9 and 10 to insure sealing engagement with the housing 1.

As shown best in FIGS. 1 and 6, a pair of arcuate sealing members 23A and 23B are disposed in an annular groove formed in the front surface of the main power rotor 8. Similarly, a pair of arcuate sealing members 24A and 24B are disposed in an annular groove formed in the back surface of the rotor 8. The sealing members 23A and B and 24A and B mate with and form a continuous surface with the respective end sealing bars 17 and 18 on the lobes 9 and 10 to insure a tight seal between the rotor 8 and the housing 1 which confines the gases to the main chamber 7.

Figure 2:
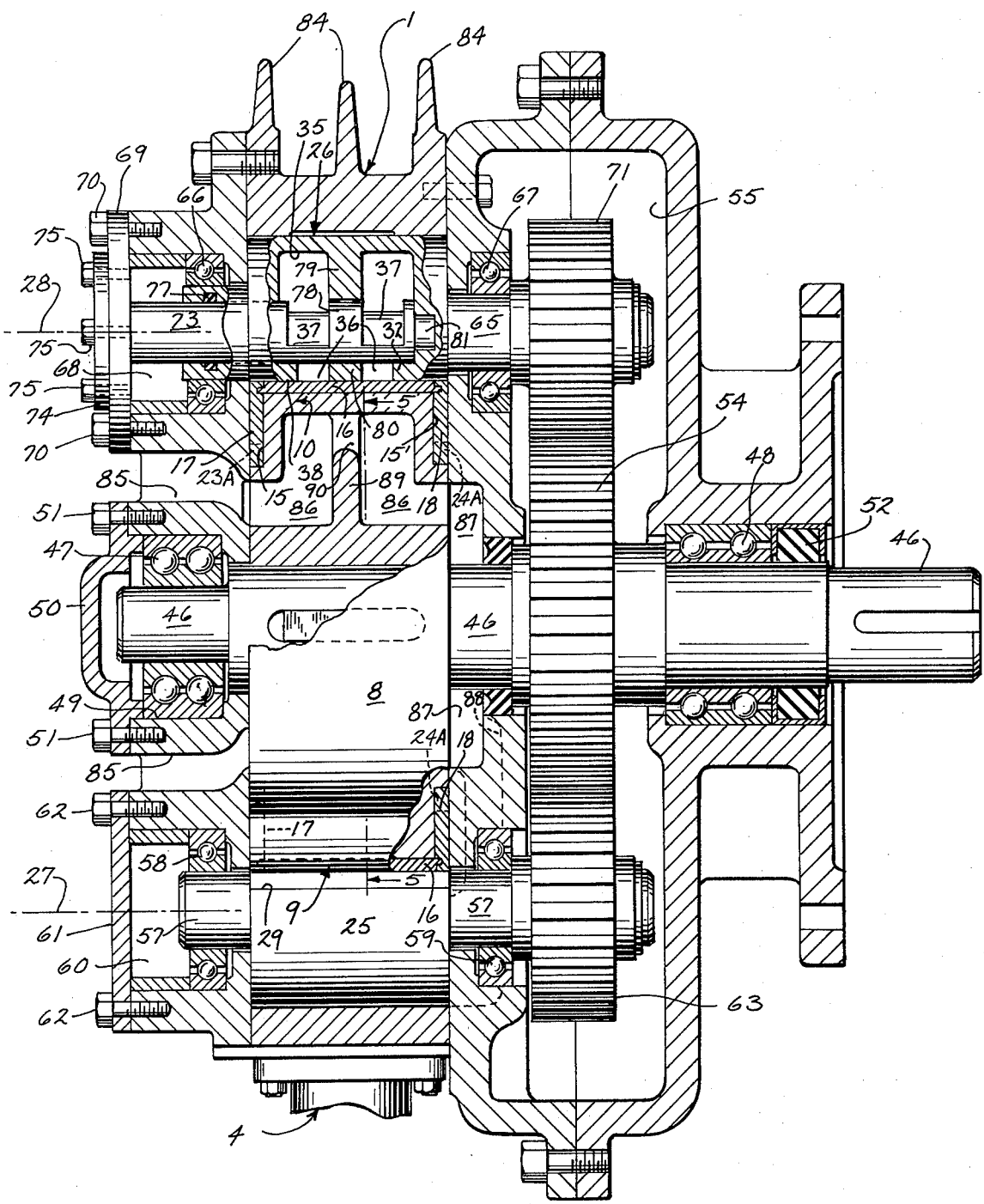
FIG. 2 is a side view with parts cut away of the invented rotary engine.

Referring to FIGS. 1 and 2, a pair of auxiliary rotors 25 and 26 are mounted to the housing 1 for rotation about respective axes 27 and 28, parallel to the main power rotor axis of rotation. The auxiliary rotor 27, hereinafter referred to as the gate rotor 27, is positioned circumferentially between the air intake manifold 3 and the exhaust port 5. It has a generally circular cylindrical shape and is positioned to make line contact with the main power rotor surface. The gate rotor 25 includes a trapezoidal recess 29 formed lengthwise along its outer surface and along the entire lengthwise extent of the main chamber 7. As the main power rotor 8 rotates in the clockwise direction indicated by the arrow 30, the gate rotor 25 is driven in a counterclockwise direction indicated by the arrow 31, and as a lobe 9 or 10 approaches the gate rotor 25, it is timed to receive the lobe in the trapezoidal recess 29 and mate therewith as the lobe swings past.

The second auxiliary rotor, hereinafter referred to as the combustion control rotor 26, is positioned directly above the main power rotor 8 and has a circular cylindrical shape similar to the gate rotor 25. The combustion control rotor 26 is also positioned radially such that its outer surface makes line contact with the outer surface of the power rotor 8. It includes a trapezoidal recess 33 similar to that on the gate rotor 25, and it rotates in a counterclockwise direction as indicated by the arrow 34 when the main power rotor 8 revolves. Unlike the gate rotor 25, however, a large control chamber 35 is formed in the combustion control rotor 26 and connects with the recess 33 by means of a passage 36 formed through a divider wall 32.

Figure 4A:
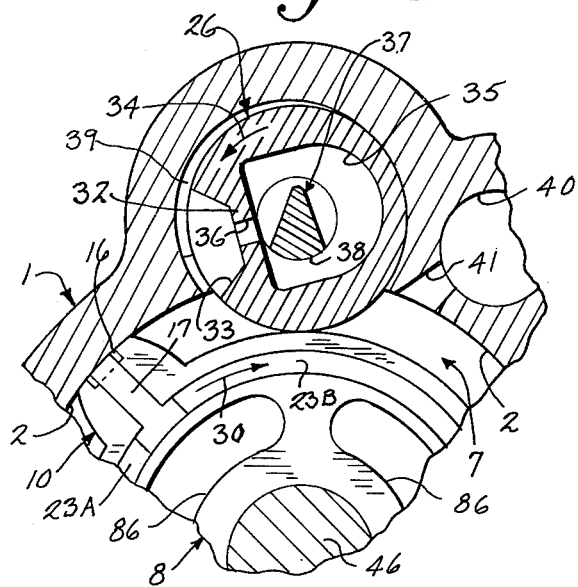
FIGS. 4A-D are partial views showing the main power rotor and combustion control rotor in successive positions during the operating cycle of the invented rotary engine.
Figure 4B:
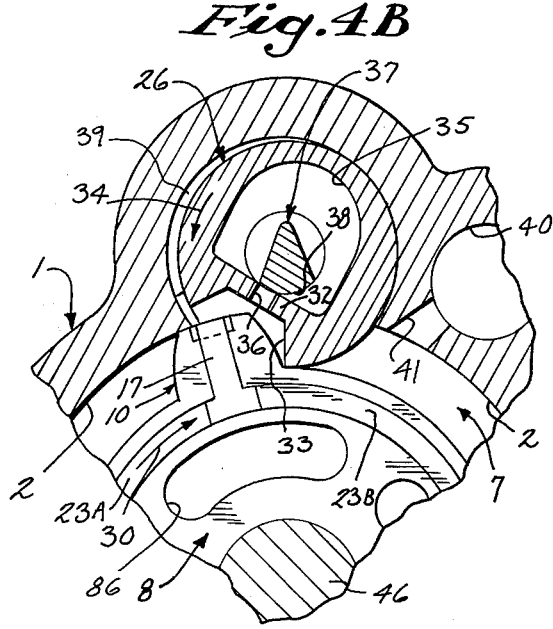
Figure 4C:
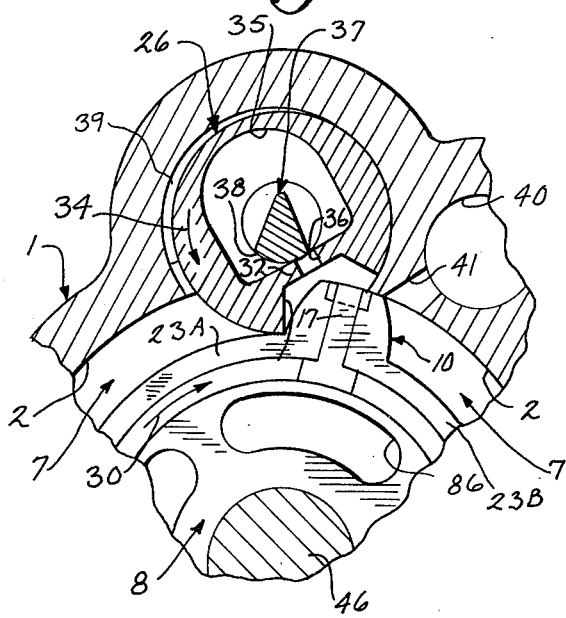

Positioned within the combustion control chamber 35 and rigidly mounted to the housing 1 is a combustion control valve 37. The valve 37 has a wedge-shaped portion which forms a curved sealing surface 38 that engages the dividing wall 32 and blocks the passage 36. The sealing surface 38 is limited in circumferential extent and is oriented generally to face downward toward the main power rotor 8. Referring to FIGS. 4A-D, the control valve 37 operates to block the passage 36 while the rotor lobes 9 and 10 engage the combustion control rotor 26. Referring specifically to FIG. 4A, as the lobe 10 approaches and is in sealing engagement with the chamber wall 2, the passage 36 is unobstructed and air is compressed in front of the advancing lobe 10 and forced into the chamber 35. A narrow, crescent-shaped inlet passage 39 is formed adjacent the leading side of the combustion control rotor 26 to facilitate entry of compressed air into the chamber 35 during the compression portion of the cycle. As shown in FIG. 4B, when the seal between the lobe 10 and the chamber wall 2 is lost the combustion control valve 37 blocks the passage 36 and entraps the highly compressed air within the chamber 35. When the lobe 10 has passed the rotor 26 and re-establishes sealing contact with the chamber wall 2, and the lip of the combustion control rotor 26 has re-established contact with the outer surface of the main power rotor 8 as shown in FIG. 4C, the passage 36 reopens and the entrapped air escapes to the main chamber 7.

Figure 4D:
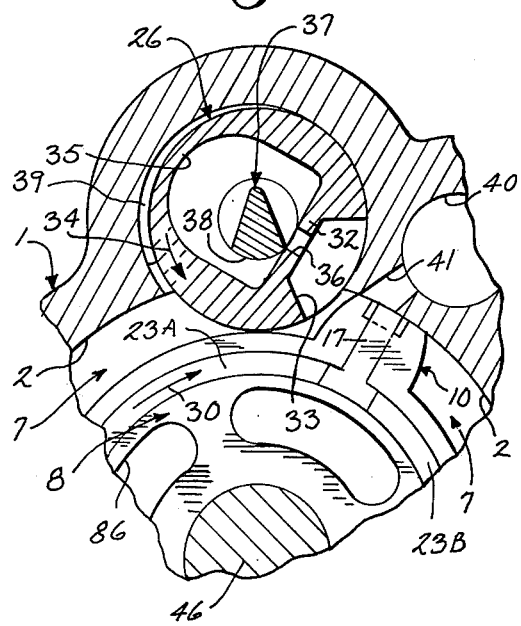

Referring again to FIG. 1, a combustion chamber 40 which is generally spherical in shape is formed in the engine housing 1 and communicates through a combustion passage 41 with the main chamber 7. The combustion passage 41 enters the outer chamber wall 2 at a point immediately adjacent the trailing side of the combustion control rotor 26. A conventional spark plug 42 is mounted to the engine housing 1 and its spark gap 43 is positioned within the combustion chamber 40. Similarly, a fuel injector 44 is mounted to the engine housing 1 to inject measured amounts of atomized fuel into the combustion chamber 40. As described above, when a lobe passes the combustion control rotor 26, the compressed air charge contained in the control chamber 35 is released as shown in FIG. 4D to the trailing side of the lobe. This air charge flows into the combustion chamber 40 in a swirling motion and fuel is injected and mixed with the air and the spark plug 42 is fired to ignite it. The resulting expanding gases exit through the combustion passage 41 and into the main chamber 7 to drive the lobe in a power stroke toward the exhaust port 5. The burned gases exit through the exhaust port 5 as the lobe rotates into engagement with the gate rotor 25.

Each lobe 9 and 10 on the main power rotor 8 executes a compression stroke and a power stroke during each revolution of the main power rotor 8. The auxiliary rotors 25 and 26 generally divide the main chamber 7 into a compression section and a power section. Referring to FIG. 1, the compression section of the main chamber 7 lies to the left of the auxiliary rotors 25 and 26 and air is drawn into this chamber by the partial vacuum generated by the trailing side of the departing lobe 10. Rotation of the main power rotor 8 in the direction indicated by the arrow 30 entraps a charge of air in the compression section of the main chamber 7 between the lobe 9 and the combustion control rotor 26. Further rotation compresses this charge and drives it into the control chamber 35 where it is entrapped by the combustion control valve 37 until the lobe 9 rotates past the combustion control rotor 26. At this point the compressed air charge is released by the combustion control valve 37 to the combustion chamber 40 where it is mixed with fuel and ignited. The expanding gases exert a force against the trailing side of the lobe 9 with the result that the lobe is forced toward the exhaust port 5 and a torque is generated.

The combustion control rotor 26 and its associated control chamber 35 operates in combination with the combustion control valve 37 to transfer the air charge from the leading side of the lobe to its trailing side. The air is highly compressed during this portion of the operating cycle of the engine and sealing engagement of the various elements is most critical. The primary purpose of the gate rotor 25 is to prevent exhaust gases from mixing with the intake air and the difficulty of maintaining an adequate seal between the gate rotor 25 and the main power rotor 8 is minimal.

Figure 3:
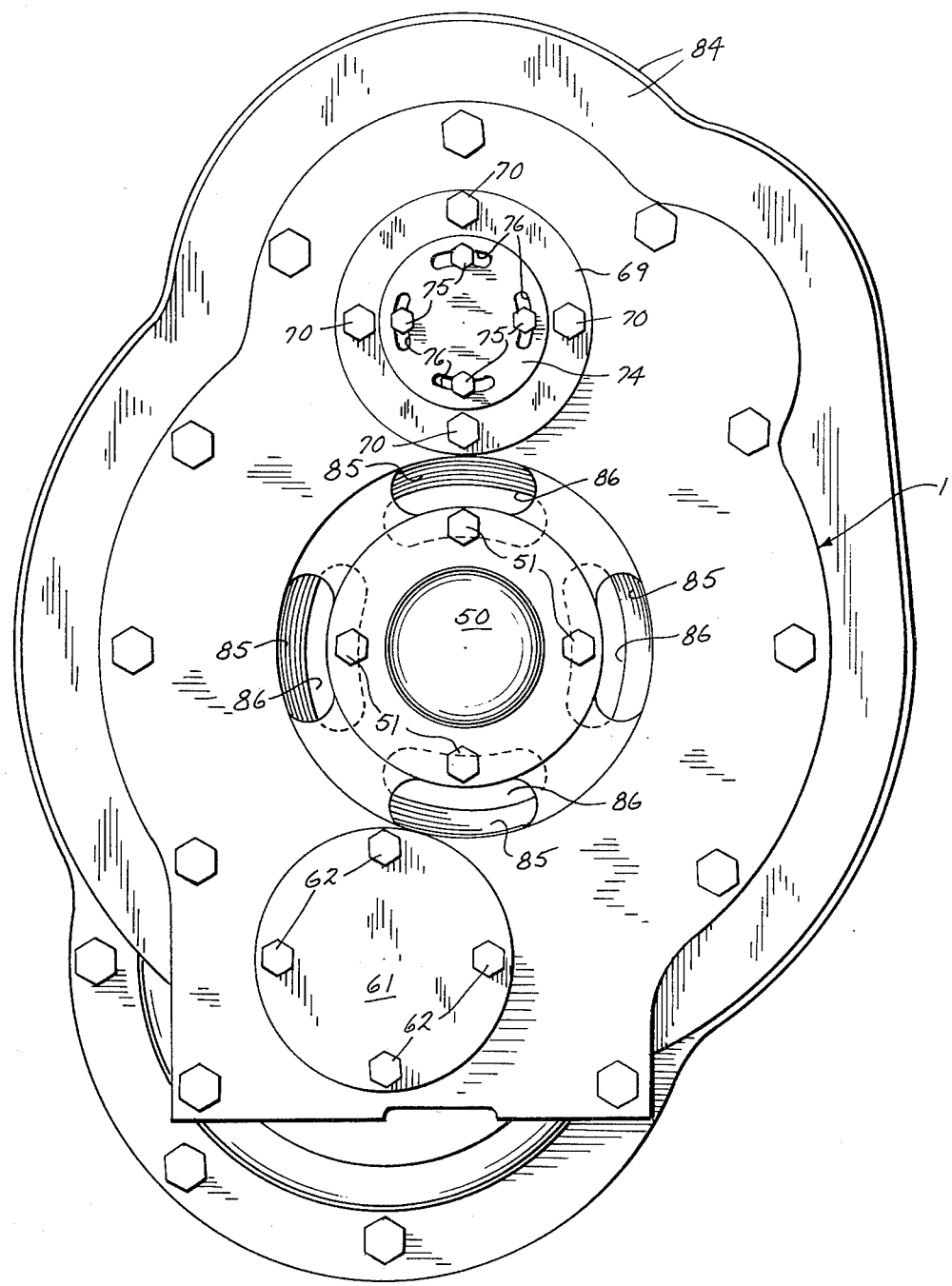
FIG. 3 is a front view of the invented rotary engine.

Referring particularly to FIGS. 1-3, the main power rotor 8 is supported by a drive shaft 46 which is rotatably mounted to the housing 1 by a set of forward ball bearings 47 and a set of rear ball bearings 48. The forward end of the drive shaft 46 is surrounded by a circular cylindrical compartment 49 and enclosed by a circular cover 50 which attaches to the housing 1 by a set of four bolts 51. The rear end of the drive shaft 46 extends through the housing 1 to connect with a transmission (not shown in the drawings) and an annular-shaped seal 52 is positioned around the drive shaft 46 to prevent entry of foreign substances into the rear ball bearings 48. Located immediately behind the main power rotor 8 and carried by the drive shaft 46 is a timing gear 54 which is contained within a relatively large timing chamber 55 formed in the housing 1 behind the main chamber 2.

The gate rotor 25 is mounted to the housing 1 for rotation about the axis 27. It is supported by a shaft 57 which is rotatably mounted by a set of forward ball bearings 58 and a set of rear ball bearings 59. The forward end of the shaft 57 is contained within a compartment 60 which is enclosed by a cover 61 fastened to the housing 1 by a set of four bolts 62. The other end of the shaft 57 extends into the timing chamber 55 and a first timing pinion 63 securely fastens thereto and engages the timing gear 54.

The combustion control rotor 26 is carried by a shaft 65, the forward end of which is rotatably attached to the housing 1 by a set of forward ball bearings 66 and the other end of which is supported by a set of rear ball bearings 67. The forward end of the shaft 65 is contained within a compartment 68 formed in the housing 1 and is enclosed by a cover 69 which is fastened to the housing 1 by a set of four bolts 70. The rear end of the shaft 65 extends into the timing chamber 55 and a second timing pinion 71 connects to the shaft 65 and engages the timing gear 54.

The forward end of the shaft 65 includes a concentric central opening which communicates between the compartment 68 and the combustion control chamber 35. The combustion control valve 37 is mounted on a support rod 73 which extends through this opening and through an aligned opening in the compartment cover 69. A control valve plate 75 is formed on the forward end of the rod 73 and the plate 74 is releasably fastened to the cover 69 by a set of four bolts 75. The bolts 75 extend through slots 76 circumferentially spaced around the perimeter of the control valve plate 74, thus allowing the combustion control valve 37 to be adjusted about the axis 28. An annular seal 77 is located in a recess which is formed on the interior of the shaft 65. The seal 77 prevents the escape of highly compressed air from the chamber 35. The combustion control valve 37 is divided into two sections by a circular mid portion 78 which provides a bearing surface that engages a support rib 79 formed within the combustion control chamber 35 and a support web 80 formed within the passage 36. A neck 81 is formed on the end of the combustion control valve 37 and is received by a corresponding recess formed in the rear wall of the combustion control rotor 26.

The timing gear 54 and the timing pinions 63 and 71 provide a two-to-one ratio. Thus, for each revolution of the main power rotor 8, the auxiliary rotors 25 and 26 are driven through two complete revolutions in the opposite direction. The trapezoidal recesses 29 and 33 in the respective auxiliary rotors 25 and 26 are oriented to receive the lobes 9 and 10 during each revolution of the main power rotor 8. The combustion control valve 37 is stationary during operation of the engine by virtue of its attachment to the cover 69 and the combustion control rotor 26 rotates about it during engine operation. The combustion control valve 37 is positioned with its sealing surface 38 directed downward toward the passage 36, however, by loosening the bolts 75, adjustments can be made to control timing and to thereby maximize engine efficiency and power output.

The amount of heat generated by the ignition of the air-fuel mixture in the combustion chamber 40 is substantial and means must be provided to cool not only the housing 1, but also the main power rotor 8. It is a relatively simple matter to cool the housing 1 by circulating water through a passage formed in the housing 1, or as shown in FIGS. 1-3, by adding cooling fins 84 about the periphery of the housing 1. Cooling of the main power rotor 8 is most difficult, however, and a solution to this problem is one of the features of the present engine. Referring particularly to FIGS. 2 and 3, a set of four cooling air intake ports 85 are formed through the housing 1 and located in quadrature around the cover 50 and concentric about the main rotor axis of rotation. A similar set of four coolant passages 86 are formed through the main power rotor 8 in quadrature about its axis of rotation. The passages 86 are spaced from the axis of rotation such that they align with the coolant air intake ports 85 at 90-degree positions of the main power rotor 8. The coolant passages 86 communicate with a coolant chamber 87 formed in the housing 1 immediately to the rear of the main power rotor 8, and the coolant chamber 87 is in turn connected to the engine air intake manifold 3 by an air passage 88 which extends downward from the chamber 87 and forward into the manifold 3. Cooling air is thus drawn in through air intake ports 85, passes through the coolant passages 86 in the main power rotor 8, is accumulated in the coolant chamber 87, and is drawn through the air passage 88 to supplement the air supply to the engine.

Figure 5:
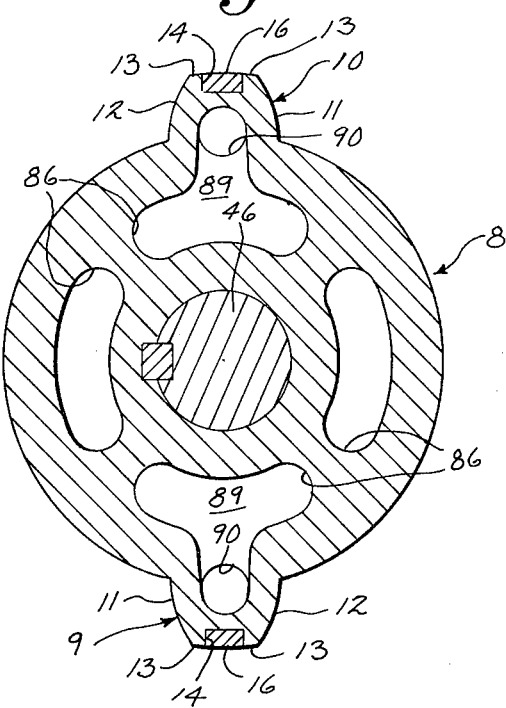
FIG. 5 is a view in cross section of the main power rotor of FIG. 2 taken on the plane 5—5.

Referring particularly to FIGS. 2 and 5, two of the coolant passages 86 in the rotor 8 are circumferentially aligned with the lobes 9 and 10. These coolant passages 86 extend radially outward into the respective lobes 9 and 10 and a web 89 interrupts each of these passages 86 at their midpoint. A circular opening 90 is formed in each of the webs 89 at their outer extremity to allow circulation of cooling air through the lobes 9 and 10 where a large amount of heat is generated during engine operation.

It should be apparent that a number of variations can be made to the structure described above and shown in the drawings without departing from the spirit of the invention. For example, additional lobes and auxiliary rotors can be added or a plurality of power rotors can be connected in tandem to the drive shaft 46.

We claim:

1. In a rotary engine having a main power rotor disposed within a main chamber that has a lobe extending radially toward the chamber wall, and a control rotor mounted for rotation in synchronized relation to the main power rotor which has a recess for meshing engagement with said lobe and a hollow interior, the improvement therein comprising:
    a communication channel between said hollow interior of said control rotor and the outer face of the rotor;
    an inlet passage in communication with the main chamber that is on a compression side of said control rotor, said inlet passage wrapping around a portion of said control rotor and conducting a compressed charge to the hollow interior of said control rotor as said power rotor lobe approaches meshing engagement with said control rotor;
    a valve member mounted within the hollow interior of said control rotor about which the rotor revolves, said valve member having a surface that closes and opens said communication channel as said control rotor revolves; and
    a combustion chamber in communication with said main chamber that is on a power side of said control rotor to receive a compressed charge from said hollow interior of said control rotor upon said power rotor lobe passing from meshing engagement with said control rotor.

2. In a rotary engine having a main power rotor disposed within a stationary housing for rotation about a main axis and surrounded by a main chamber, a pair of lobes extending radially outward from said main axis and into engagement with the main chamber walls, and a combustion control rotor mounted to said housing for rotation about a second axis parallel to said main axis, said combustion control rotor including a recess which receives each of said lobes during engine operation and a combustion control chamber formed therein and connected with said recess by a passage, the improvement therein comprising:
    an inlet passage formed in said housing and wrapping around the exterior surface of said combustion control rotor over a substantial portion of its circumference to couple the main chamber with said passage in said combustion control rotor over a preset portion of its operating cycle; and
    a combustion control valve mounted to said housing and positioned within said combustion control chamber, said combustion control valve including a curved sealing surface which blocks said passage during a preset portion of the engine operating cycle.

3. The rotary engine as recited in claim 2 in which said combustion control valve is carried by a support rod and said combustion control rotor is carried by a shaft having a central opening concentric about said second axis through which said support rod extends to connect with said housing.

4. The rotary engine as recited in claim 3 in which said support rod is releasably connnected to said housing to allow rotation of said combustion control valve about said second axis to thereby allow adjustment of said preset portion of said engine operating cycle during which said passage is blocked.

5. The rotary engine as recited in claim 2 in which the combustion control chamber defines a circular cylindrical chamber portion with which said passage connects and the combustion control valve occupies a sector of said chamber portion.

6. In a rotary engine having a main power rotor disposed within a main chamber that has a lobe extending radially toward the chamber wall, and a control rotor mounted for rotation in synchronized relation to the main power rotor which has a recess for meshing engagement with said lobe and a hollow interior, the improvement therein comprising:
    a. said control rotor extending into said main chamber, to have a compression region on the leading side of said control rotor and a combustion region on the trailing side of said control rotor;
    b. a communication channel in the wall of said control rotor extending between said hollow interior and the exterior for conducting gas from and discharging gas to said main chamber;
    c. said hollow interior of said control rotor comprising a control chamber for holding compressed gas during said meshing engagement of said lobe and control rotor and then discharging such gas toward said combustion region;
    d. a valve member mounted within said control rotor hollow interior having a curved valving face over which said communication channel rides for a minor portion of its rotation, such valving face being spaced from the control chamber wall during other rotational positions of said control rotor; and
    e. ignition means located in said combustion region.

7. A rotary engine as in claim 6 wherein said valve member is on a shaft concentric with said control rotor and extending outside said rotor for rotational adjustment of said valve member valving face.

8. A rotary engine as in claim 6 wherein an inlet passage forming a continuation of said compression region overlays the leading side of said control rotor.

9. A rotary engine as in claim 8 wherein said communication channel opens upon said control rotor recess.

* * * * *